United States Patent [19]

Beecher

[11] 4,140,568

[45] Feb. 20, 1979

[54] MECHANISM FOR FORMING AND MOUNTING MIRRORS IN THE SHELL OF A BINOCULAR OR LIKE VIEWING INSTRUMENT

[76] Inventor: William J. Beecher, 1960 Lincoln Park West, Chicago, Ill. 60614

[21] Appl. No.: 854,135

[22] Filed: Nov. 23, 1977

Related U.S. Application Data

[63] Continuation-in-part of Ser. No. 781,750, Mar. 28, 1977, abandoned.

[51] Int. Cl.² .................. B32B 1/10; B32B 31/20
[52] U.S. Cl. ............................ 156/560; 29/281.3; 29/281.5; 156/579; 156/581
[58] Field of Search ............... 156/560, 580, 581, 559, 156/579, 476, 232, 233, 241, 235, 237, 228; 29/281.1, 281.3, 281.5; 100/295; 427/162, 404; 350/36, 145, 320

[56] References Cited

U.S. PATENT DOCUMENTS

| | | | |
|---|---|---|---|
| 1,973,101 | 9/1934 | Ready | 156/233 X |
| 3,052,969 | 9/1962 | Loven | 29/281.1 X |
| 3,743,566 | 7/1973 | Louthan et al. | 156/580 X |
| 3,918,792 | 11/1975 | Beecher | 350/36 X |

Primary Examiner—William A. Powell
Assistant Examiner—Thomas Bokan
Attorney, Agent, or Firm—Norman H. Gerlach

[57] ABSTRACT

A press-type mechanism by means of which reflective, mirror-forming layers in the form of coatings or conventional mirrors are transferred in pairs from right-angle master surfaces on prism-like blocks to right-angle mirror blanks, and the latter with the mirror-forming layers thereon are then delivered to the optical system of the shell of a binocular or like viewing instrument where they automatically become cemented in place so that the mirror-forming layers assume an accurate porro relationship. The existence of the epoxy or other cementitious material which is used for the cementing operation compensates for discrepancies in manufacturing tolerances of either the replicated mirror blanks or the binocular shell.

17 Claims, 5 Drawing Figures

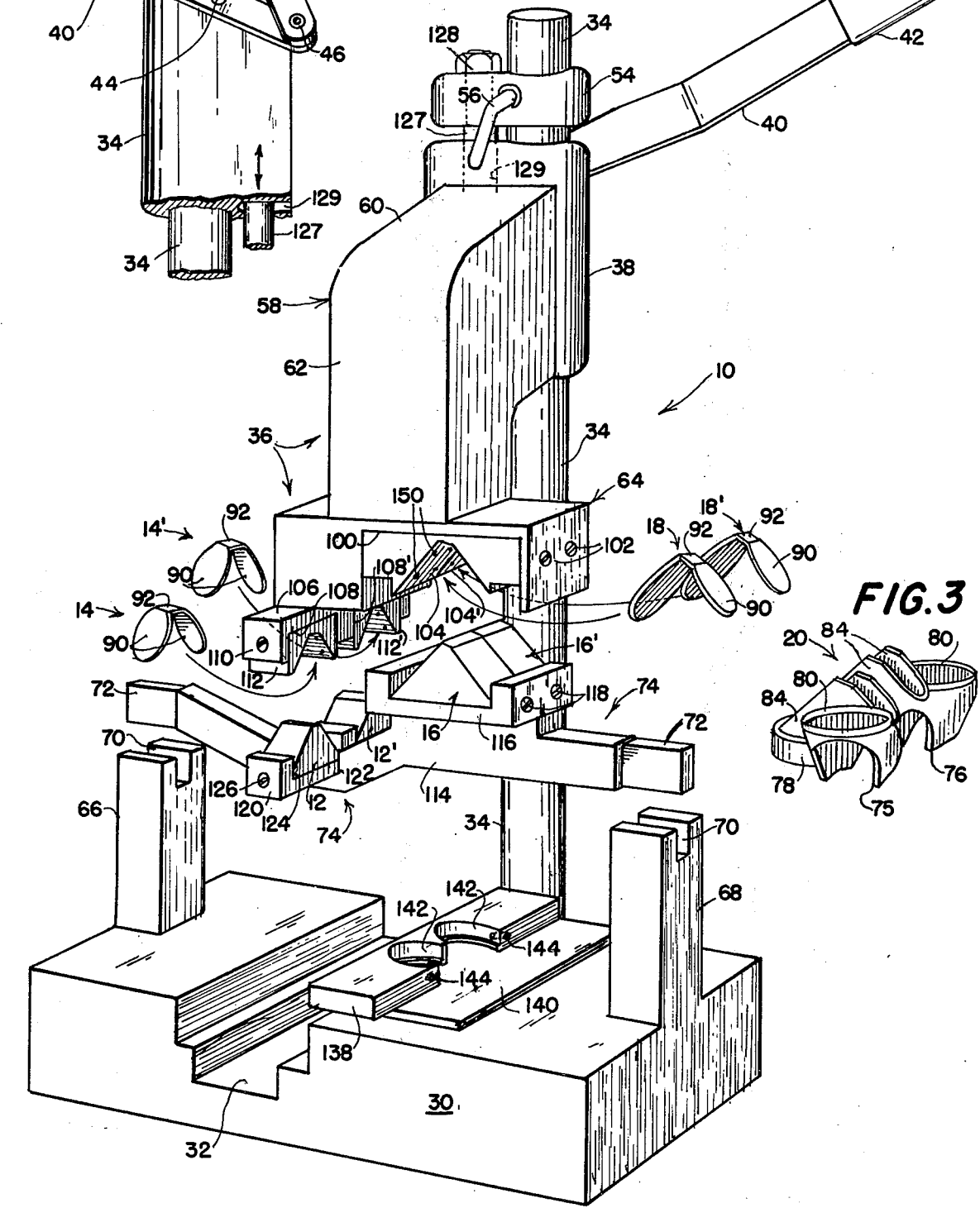

MECHANISM FOR FORMING AND MOUNTING MIRRORS IN THE SHELL OF A BINOCULAR OR LIKE VIEWING INSTRUMENT

This patent application is a continuation-in-part of my co-pending U.S. patent application Ser. No. 781,750, filed on Mar. 28, 1977, now abandoned and entitled "MECHANISM FOR FORMING REPLICATED MIRRORS AND MOUNTING THEM IN THE SHELL OF A BINOCULAR OR LIKE VIEWING INSTRUMENT."

The present invention relates generally to mirror-type binoculars or similar viewing instruments and has particular reference to a mechanism for simultaneously forming eight (four pairs) mirrors of either the replicated or the conventional type and then positioning the mirrors which form a part of the optical system of a mirror-type binocular accurately in porro relationship within the binocular shell.

In a binocular which employs porro-related mirrors, if any one of the eight mirrors deviates a few thousandths of an inch in any plane with respect to the other mirrors, proper collimation will be lost. Moreover, with such a mirror deviation, it is practically impossible to determine which mirror is at fault or out of proper adjustment and, even if detection could be made, readjustment thereof would be a tedious task and hardly worth the effort from the standpoint of binocular production or manufacture.

The subject invention is specifically concerned with a novel apparatus or mechanism which is adapted in connection with each operation first simultaneously to form eight mirrors in the form of four pairs of mirrors and then to mount or install the pairs of mirrors in the shell of a binocular in accurate porro relationship, and is further adapted to be repeatedly operated, thereby largely eliminating the skilled hand labor that has heretofore prevented the mass production of mirror-type binoculars. Moreover, by utilizing the present mechanism, any existing small manufacturing tolerances which may be present in successive binocular shells or in successive mirror blanks are automatically compensated for and the mirrors are delivered during each cycle of operation and accurately positioned in their porro relationship and, thereafter, remain accurately and properly positioned in the binocular shell.

Briefly, the mechanism constituting the present invention embodies some of the physical aspects of a conventional punch press in that it includes or embodies a bed or base and a vertically shiftable cooperating press head. Facilities are provided on the press base for selectively supporting the binocular shell in either an upright or an inverted position. In between the base and head, i.e., above the base and beneath the head, there is removably disposed a block-supporting stage having mounted thereon four prism-like master blocks, each of which is provided with two accurately ground right-angle master surfaces, there being eight such surfaces in all with the surfaces being presented generally upwardly. Each master surface is designed to have formed thereon or applied thereto a reflective, mirror-forming layer in the form of a coating or a conventional mirror for subsequent transfer to a mirror blank. Directly above the block-supporting stage and in vertical alignment with the four prism-like master blocks are four prism caps having pairs of downwardly facing right-angle surfaces which are shaped correspondingly to and precisely complement the eight upwardly facing right-angle master surfaces of the four prism-like master blocks, such prism caps being mounted on and movable bodily with the vertically shiftable press head. Each pair of downwardly facing right-angle surfaces of a prism cap is designed to receive thereon in substantially coextensive relationship a right-angle mirror blank the inner or opposed sides of which constitute mounting surfaces which are adapted to receive thereon the reflective, mirror-forming layers which previously were applied to the master surfaces of the associated or subjacent prism-like master block on the block-supporting stage. With the latter in position beneath the press head, an initial lowering of the head brings the mounting surfaces of the right-angle mirror blanks into effective engagement with the reflective, mirror-forming layers on the master surfaces of the prism-like master blocks and a subsequent raising of the press head causes the layers to be picked off or removed from said master surfaces as the result of adherence to the mounting surfaces of the mirror blanks, the right-angle mirror blanks with the transferred, reflective, mirror-forming layers thereon constituting the eight mirrors for the binocular being formed by use of the aforementioned press-type mechanism. Thereafter, with the block-supporting stage removed from its normal operative position in the press-type mechanism and with the binocular shell assuming either its upright or its inverted position on the press base, a second lowering or downward shifting of the press head will lower one set of two right-angle mirror blanks with the adhered reflective, mirror-forming layers thereon into the proper position in the binocular shell, thus supplying the optical system of the binocular with four of its mirrors. Reversing of the binocular shell on the press base and lowering the press head a second time in the same manner will bring the other set of two right-angle mirror blanks with the adhered reflective, mirror-forming layers thereon into position in the shell, thus supplying the remaining four mirrors for the optical system of the binocular. An important feature of the present invention resides in the fact that a suitable epoxy or other cementitious coating is applied to either the edges of the mirror blanks, the mirror-receiving edges of the binocular shell, or to both sets of such edges before either of the two mirror-carrying blanks is lowered into position with respect to the binocular shell which is intentionally made to be somewhat oversize for loose fit of the blanks with the mirrors thereon, and the further fact that the press head is maintained in its lowered position for a period of time which is adequate for the epoxy or other cementitious material to become fully set or hardened. Thus, any discrepancies arising due to wide manufacturing tolerances in the construction of either the right-angle mirror blanks or mirror-seating apertures in the binocular shell will not affect the correct positioning of the mirrors in the shell since the press head will hold the mirror-carrying blanks fixedly positioned in their proper relationship with respect to the shell while the epoxy sets.

The provision of a press mechanism such as that which has briefly been outlined above and possesses the stated advantages, constitutes the principal object of the present invention.

A further object of the invention is to provide a mechanism which is designed primarily for forming mirrors and mounting them properly in the shells of mirror-type binoculars and is characterized by simplicity, high efficiency, and comparatively low cost of manufacture.

Numerous other objects and advantages of the invention not at this time enumerated will become readily apparent as the nature of the invention is better understood from a consideration of the following specification or detailed description.

The invention consists in the several novel features which are hereinafter set forth and are more particularly pointed out by the claims at the conclusion hereof.

In the accompanying three sheets of drawings forming a part of this specification, one physical and illustrative embodiment of the invention is shown.

In these drawings:

FIG. 1 is a front perspective view, illustrated in somewhat exploded fashion, showing a press-type mechanism which is to form the necessary number of mirrors for a mirror-type binocular and then properly to apply the mirrors in the binocular shell;

FIG. 2 is a fragmentary rear perspective view of a portion of the press-type mechanism of FIG. 1;

FIG. 3 is a perspective view of a binocular shell into which the mirrors are adapted to be placed by utilizing the mechanism of FIG. 1;

Figure 4:
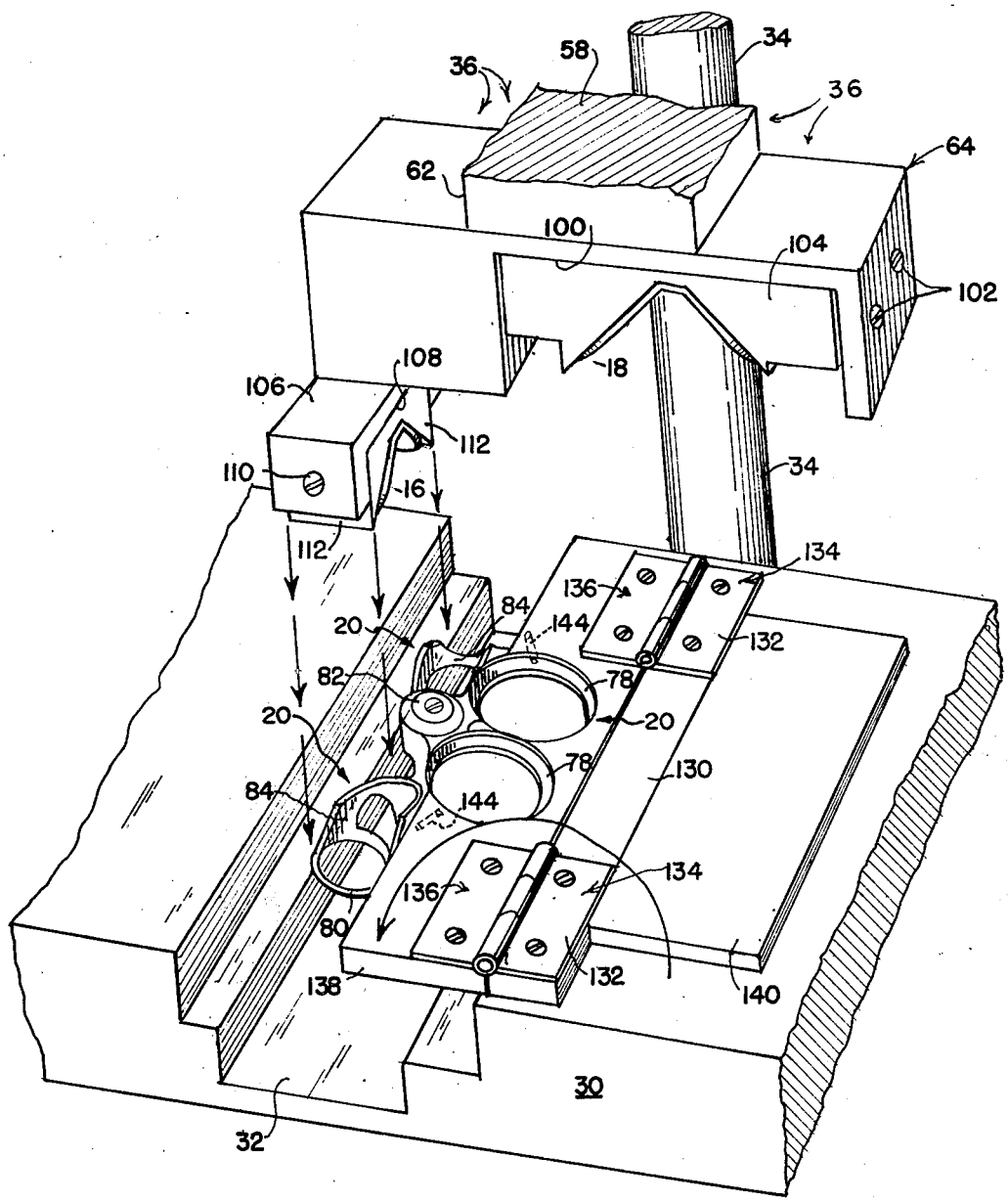
Figure 5:
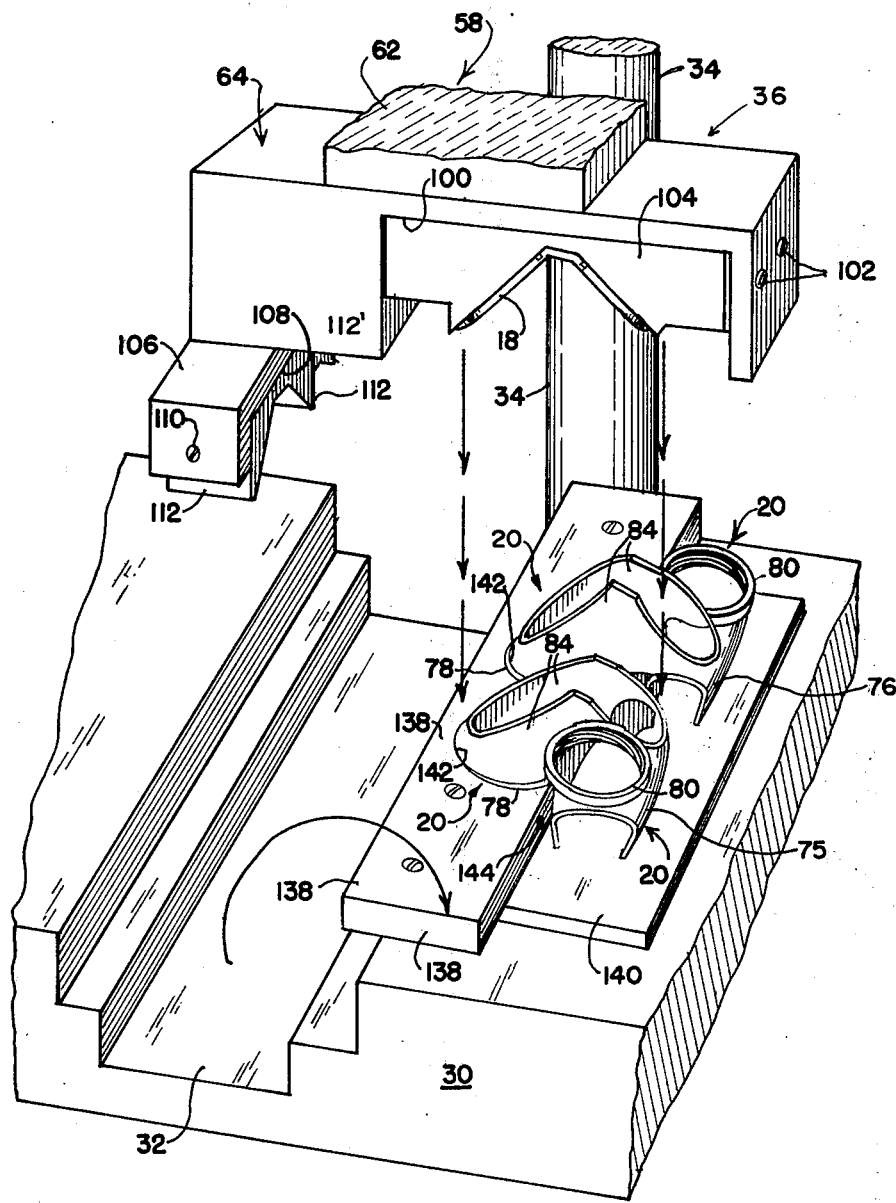

FIG. 4 is an enlarged fragmentary front perspective view of a portion of the press-type mechanism of FIG. 1, illustrating a method step whereby two pairs of mirrors are placed in the eyepiece apertures of the binocular shell of FIG. 1; and FIG. 5 is an enlarged fragmentary front perspective view similar to FIG. 4 but illustrating a method step whereby two pairs of mirrors are placed in the objective apertures of the binocular shell of FIG. 3.

Referring now to the drawings in detail, and in particular to FIG. 1, there is disclosed in this view a press-type mechanism 10 by means of which a plurality of comparatively thin, reflective, mirror-forming layers that are initially applied to the outside right-angle faces that exist on a first pair of prism-like master blocks 12 and 12' are transferred to the inner right-angle surfaces that exist on a corresponding pair of mirror blanks 14 and 14', while at the same time a plurality of similar, reflective, mirror-forming layers that are initially applied to outside right-angle faces that exist on a second pair of prism-like master blocks 16 and 16' are transferred to the inner right-angle surfaces that exist on a corresponding pair of mirror blanks 18 and 18'. A first operation of the mechanism 10 serves to effect the aforementioned transfer of eight reflective, mirror-forming layers simultaneously from their respective master blocks 12, 12', 16 and 16' to the proper surfaces of the corresponding mirror blanks 14, 14', 18 and 18'. Thereafter, by a second operation of the press-type mechanism and after removal from the mechanism of the hereinafter described removable supporting member or stage on which the master blocks are mounted, the mirror blanks 14 and 14' with the mirror-forming layers thereon are caused to be applied to or inserted in the body of a binocular shell such as the shell which is illustrated in FIG. 3 of the drawings and designated in its entirety by the reference numeral 20, the binocular shell at this time being supported by the press-type mechanism 10 in what will be referred to herein as an inverted position as shown in FIG. 4 where certain shell surfaces or edges present themselves upwardly for reception thereon of the mirror blanks 14 and 14'. Application of the mirror-carrying blanks 18 and 18' to, or insertion thereof in, the binocular shell 20 is then effected by inverting the shell so that it is supported with certain other shell surfaces or edges presented upwardly and a third press mechanism operation is resorted to in order to cause the mirror-carrying blanks 18 and 18' to be placed on such surfaces or edges as shown in FIG. 5.

As will be set forth in detail subsequently when the nature of the press-type mechanism 10 is better understood, deposition of the mirror-carrying blanks on or in the binocular shell is made with extreme accuracy so that the various resultant binocular mirrors assume their desired and necessary porro relationship in the optical system of the binocular, the exactitude of their positioning being the result of an epoxy bonding of such mirror-carrying blanks in place so that any small discrepancies in the manufacture of successive mirror-carrying blanks or binocular shells will be compensated for.

Referring now to FIGS. 1 and 2 of the drawings wherein the details of the press-type mechanism 10 are best illustrated, such mechanism involves in its general organization a press base 30 which is in the form of a generally rectangular block-like body and has the medial region thereof formed with a transversely extending stepped trough-like recess 32. Projecting vertically upwardly from the base 30 at a location adjacent to the rear side face of the press base is a cylindrical column 34 on which there is mounted for vertical sliding movement a press head 36. The lower end of the column 34 is fixedly secured to the base 30 in any suitable manner. The press head is provided with a vertically extending sleeve 38 which closely encompasses the column 34 and constitutes the means by which the head is vertically slidable on the column.

The illustrated press-type mechanism 10 is essentially a hand press, and vertical movements of the head 36 on the column 34 are effected under the control of a lever 40 which is provided on one end portion with a hand grip 42 and has the central portion pivoted to the sleeve 38 by way of a horizontal pivot-forming bolt 44 which extends through a horizontal hole in the lever and into a screw-threaded socket in the sleeve 38 and permits the lever to swing up and down in a vertical plane. The other end portion of the lever 40 constitutes one link 46 of a two-link toggle joint 48, the other link 50 of the toggle joint having one end thereof pivotally connected by a horizontal pivot pin to the free or outer end of the link 46 and its other end pivotally connected by a horizontal pivot pin 52 to one side of a reaction collar 54 which is normally fixedly fastened by a set screw 56 to the upper end region of the column 34. When the lever 40 as viewed in FIG. 2 is swung in a counterclockwise direction, it operates through the medium of the toggle joint 48 to slide the press head 36 downwards, and when the lever is swung in the opposite direction, i.e., clockwise, it operates through the medium of said toggle joint to slide the press head upwards on the cylindrical column 34. If it is desired to change or vertically adjust the up and down sliding movement of the press head, the set screw 56 is loosened and then the collar 54 is adjusted upwards or downwards, depending upon whether the stroke of the press head is to be raised or lowered. After proper vertical adjustment of the collar 54 on the upper end region of the column 34, the set screw 56 is tightened so as to lock the collar in its adjusted position. Whereas the press-type mechanism 10 has been described and illustrated as a hand-operated mechanism, it is, of course, contemplated that the mechanism may be power-operated.

The vertically shiftable press head 36 includes a body portion 58 which is generally of inverted L-shape design and has a horizontal upper portion 60 and a vertical lower portion 62. The upper portion 60 is suitably fixedly connected to the vertically extending sleeve 38 and projects laterally and forwardly therefrom. The lower portion 62 carries at its lower end a blank-supporting fixture 64, the nature and function of which will be described in detail presently. The press base 30 is horizontally elongated and embodies at its end portions a pair of upstanding posts 66 and 68 having the upper ends thereof provided with notches 70, such notches being designed for removable reception therein of the reduced ends 72 of an elongated horizontally extending supporting member or stage 74 for the aforementioned prism-like master blocks 12, 12' and 16, 16'. For convenience of description herein, such master blocks will be referred to hereinafter as "master prisms" or simply as "prisms," while the supporting member 74 will be referred to as the "prism-supporting stage," such terminology also being employed in the claims at the conclusion hereof.

Before entering into a description of the specific nature of the blank-supporting fixture 64, the prism-supporting stage 74 and the means whereby the binocular shell 20 is supported on the press base 30 for reversal of its position thereon as previously described, it is deemed expedient to indicate the nature of the four mirror blanks 14, 14' and 18, 18', as well as the nature of the binocular shell 20 to which such blanks are to be applied in porro relationship. Considering now the binocular shell 20 of FIG. 3, such shell is of the general type which is used in connection with the binocular which is shown and described in my copending U.S. patent application Ser. No. 729,843, filed on Oct. 4, 1976, now abandoned and entitled "BINOCULAR WITH NOVEL ARRANGEMENT OF HINGE MEANS BETWEEN THE TELESCOPES THEREOF." Actually, the aforementioned binocular shell 20 is in the form of an assembly which comprises two principal parts in the form of a pair of shell halves 75 and 76, each of which is provided with an internally-threaded objective rim 78 into which a lens-containing objective barrel (not shown) is adapted to be threadedly received, and an internally-threaded eyepiece rim 80 into which a lens-containing eyepiece barrel (also not shown) is adapted to be threadedly or cementitiously received. As is conventional practice, the two objective rims 78 of the shell halves 75 and 76 are hingedly connected together by a suitable hinge arrangement 82 in order that the interpupillary distance between the eyepiece lenses which are fitted into the eyepiece rims 80 of the two shell halves may be adjusted either outwards or inwards. The hinge arrangement 82 is hidden from view in FIG. 3 of the drawings but appears in FIG. 4 and will be discussed subsequently. Each of the two hingedly connected shell halves is provided with a generally right angular hollow shell body 84 which presents two sets of generally arched edges which are adapted to receive thereover the peripheral regions or edges of one of the aforementioned mirror-carrying blanks, i.e., mirror blank 14, mirror blank 14', mirror blank 18 or mirror blank 18'. When the mirror-carrying blanks are properly positioned with respect to the bodies 84 of the shell halves, they are fixedly or permanently secured in place by an epoxy bonding operation as will be described presently, and when the various mirror blanks to which reflective, mirror-forming layers have been applied are all in place on the bodies of the shell halves and the eyepiece and objective barrels are threadedly received in the rims 78 and 80, the formerly open shell halves 75 and 76 are closed and the binocular is then complete and in readiness for use. When each shell halve is completed with the various mirrors and lenses installed therein, it forms one of the two telescopes of the binocular which is formed by way of the mechanism and method which constitute the present invention.

Considering now the nature of the four mirror blanks 14, 14' and 18, 18', the two mirror blanks 14 and 14' are smaller in size than are the two mirror blanks 18 and 18'. They fit on the bodies 84 of the shell halves 75 and 76 of the binocular shell 20 in the vicinity of the internally-threaded eyepiece rims 80 and, therefore, they will be hereinafter referred to as "eyepiece mirror blanks." The mirror blanks 18 and 18' fit on the bodies 84 of the two shell halves in the vicinity of the threaded objective rims 78 and, therefore, they will be hereinafter referred to as "objective mirror blanks."

Each eyepiece mirror blank, 14 or 14' as the case may be, is comprised of two generally oval flat plates 90 which are of unequal size and extend at a right angle to one another and are connected together by a short, flat, narrow bridge piece 92. As will be described presently, the inside or opposing faces of the plates 90 constitute mounting surfaces that are adapted to receive thereon reflective, mirror-forming layers. The larger objective mirror blanks 18 and 18' are similarly constructed and the parts thereof have been respectively designated by the same reference numerals.

The aforementioned blank-supporting fixture 64 which is carried at the lower end of the vertical portion 62 of the vertically slidable press head 36 of the mechanism 10 is of rectangular block-like design and the underneath side thereof is provided with a downwardly facing rectangular recess 100 which is of major proportions and has fixedly but shiftably secured therein by means of horizontally extending anchoring screws 102, a pair of side-by-side elongated prism caps 104 and 104', the latter, although not so illustrated in FIG. 1 of the drawings, are of slightly less length than the downwardly facing rectangular recess 100 and are adapted to have between their ends and the ends of the recess one or more shims (not shown) in order that they may be lengthwise adjusted as desired and then locked in place by tightening of the anchoring screws 102. Said prism caps 104 and 104' are shaped to form downwardly facing inverted V-shaped recesses the surfaces of which extend at a right angle to one another and precisely complement the outer faces of the two objective mirror blanks 18 and 18'. A saddle-like member 106 is fixedly secured to the underneath side of the blank-supporting fixture 64 at one end thereof and in side-by-side relation with the recess 100. It extends at right angles to said recess 100 and is formed with two downwardly facing rectangular recesses 108 and 108' within which there are respectively mounted and shiftably held by anchoring screws 110, two prism caps 112 and 112'. The latter are longitudinally or lengthwise adjustable by way of shims (not shown) in the same manner as the prism caps 104 and 104' and are shaped to form downwardly facing inverted V-shaped recesses the surfaces of which are at a right angle to one another and precisely complement the outer faces of the two eyepiece mirror blanks 14 and 14'. As will be described in greater detail subsequently, when the replicated mirror-forming method of the present invention which is carried out by the use of the press mechanism 10 is set forth, the opposed right angle surfaces of the inverted V-shaped recesses which are formed in the various prism caps 104, 104' and 112 and 112' are precision ground or lapped to an extremely high degree so that they are smooth and planar and hence are so designed or formed as to receive thereon by vacuum adherence the mirror blanks 18, 18' and 14, 14' respectively.

Considering further the nature or design of the aforementioned prism-supporting stage 74, such stage is in the form of an elongated bar-like member 114 the reduced ends 72 of which are designed for removable reception in the aforementioned notches 70 in the upper ends of the posts 66 and 68. An elevated cradle 116 is mounted on a medial region of the member 114, extends lengthwise of said member, and serves to support therein the aforementioned master prisms 16 and 16' in side-by-side relation, suitable horizontally extending anchoring screws 118 at one end of the cradle being provided for fixedly but shiftably holding said prisms in positioning within the cradle 116. It is to be understood that the master prisms 16 and 16' are of less length than the distance between the upstanding end walls of the cradle 116 and also that shims (not shown) adjacent to the ends of the master prisms 16 and 16' will be employed in order lengthwise to adjust said master prisms into their proper operative positions. It is also to be understood that after proper positions of the shims, the anchoring screws 118 will be tightened in order to lock said prisms in their adjusted positions. A cradle 120 which is similar to the cradle 116 but disposed at a lower level extends transversely of the bar-like member 114. It is secured in a recess 122 in a medial region of said bar-like member and is, itself, formed with a pair of longitudinally aligned recesses 124 which receive therein the master prisms 12 and 12', suitable horizontally anchoring screws 126 being provided for holding such prisms fixedly but shiftably in place. Shims (not shown) are used at the ends of the recesses 124 in order lengthwise to adjust the master prisms 12 and 12' to their proper operative positions.

When the prism-supporting stage 74 is in its operative position on the posts 66 and 68, the prisms 16 and 16' directly underlie the prism caps 104 and 104' respectively and are in precise vertical alignment therewith. Similarly, when the stage 74 is in place on the posts 66 and 68, the prisms 12 and 12' directly underlie the prism caps 112 and 112' respectively and are in precise vertical alignment therewith. Such vertical alignment of parts is to a certain extent made possible by reason of a vertically extending, shouldered, anti-torque guide post 127 which depends from the collar 54. The upper end of such post is screw-threaded, extends through a vertical hole in the collar, and is fixedly secured in place by means of a nut 128. The intermediate and lower portions of the anti-torque post project into an open-sided slot 129 in the sleeve 38 with the result that the sleeve is free to slide vertically on the column 34 but is prevented from rotating relatively to said post. Instead of employing or using the anti-torque post 127 to prevent the sleeve 38 from rotating relatively to the column 34, a second column (not shown) in side-by-side relation with the column 34 may be utilized.

As previously stated, the binocular shell 20 is capable of being removably mounted on the press base 30 and is also capable of being reversed thereon so that it may assume either the inverted position in which it is shown in FIG. 4 or the upright position in which it is shown in FIG. 5. Accordingly, and with reference to FIGS. 1, 4, and 5 of the drawings, an elongated transversely extending hinge mount 130 is fixedly secured to the upper face of the press base and has secured thereto the fixed hinge leaves 132 of a pair of side-by-side but spaced apart precision hinge assemblies 134. The swinging or movable hinge leaves 136 of the assemblies 134 serve to support a shell mounting plate 138 so that it is capable of being swung back and forth between an extended horizontal position as shown in FIG. 4 and a folded or retracted position as shown in FIG. 5. In its extended horizontal position, the mounting plate projects partially across the stepped trough-like recess 32 and in its folded or retracted position the mounting plate extends in reentrant fashion over the upper face of the press base 30 (see FIGS. 1 and 5), overlies the hinge mount 130, and finds reaction support on a rectangular plate 140 which is suitably fixedly mounted on the upper face of the press base 30.

As best shown in FIG. 1 of the drawings, the binocular shell mounting plate 138 is formed with a pair of semicircular recesses 142 which are adapted removably to receive therein the objective rims 78 of the binocular shell 20. Anchoring screws 144 extend diagonally through the distal edge region of the shell mounting plate 138 and into the restricted mouth portions of the recess 142 and serve when tightened to hold said objective rims 78 securely in the recesses to the end that the binocular shell 20 is fixedly secured to the mounting and hence capable of swinging back and forth with it. As shown in FIG. 4, when the objective rims 78 of the binocular shell 20 are properly installed in the recesses 142 and the binocular mounting plate 138 is in its horizontal extended position wherein it overlies the recess 32 in the press base, the shell assumes its inverted position (see FIG. 4). When the mounting plate 138 is folded back over the upper face of the press base 30 as shown in FIG. 5, the binocular shell 20 assumes its upright position as portrayed in FIG. 3. In the upright position of the shell, one set of arched edges of the bodies 84 of the shell halves 75 and 76 underlie and are in vertical alignment with the prism caps 104 and 104'. In the inverted position of the binocular shell 20 as shown in FIG. 4 of the drawings, i.e., when the mounting plate 138 overlies the recess 32, the other set of arched edges of the bodies of the two shell halves underlie and are in vertical alignment with the prism caps 112 and 112'.

As heretofore indicated, the reflective, mirror-forming layers are in the form of either coatings for application to the downwardly facing mounting surfaces of the mirror blanks 14, 14' and 18, 18' or conventional mirrors. If the layers are in the form of coatings, they are applied to such mounting surfaces of the mirror blanks by way of a so-called "replication" method.

In the utilization of the press mechanism 10 for the purpose of creating or forming reflective surfaces or mirrors by the so-called replication method and then installing them in binocular shells such as the shell 20 of FIG. 3, a separator coating and a reflective (mirror) coating are applied in any suitable or well-known manner to each of the right-angle surfaces of the four prisms 12, 12' and 16, 16' either before or after such prisms are mounted in their respective cradles 106 and 116. With the thus coated prisms properly installed in the cradles on the stage 74, the latter is mounted in the notches 70 in the upper ends of its supporting posts 66 and 68, while the press head 38 is maintained in its fully raised position. Thereafter, the mirror blanks 14, 14' and 18, 18' are caused to receive a coating of an epoxy resin or other suitable adhesive on their inner or opposed faces and the blanks are installed in proper registry within the respective inverted V-shaped recesses in the prism caps 112, 112' and 104, 104', positioning of the blanks preferably being maintained by vacuum adhesion as previously mentioned. So far as an epoxy or other adhesive is concerned it is contemplated that one will be selected which upon hardening or drying will not distort, warp or otherwise damage the reflective coatings on the right-angle surfaces of the four prisms. Accurate positioning of the blanks 14, 14' and 18, 18' within their respective prism caps may be attained by means of locating protuberances 150 on the inner surfaces of the inverted V-shaped recesses in the prism caps. Thereafter, by means of the lever 40, the press head 36 is lowered to an intermediate position, i.e., until all eight right-angle prism cap surfaces register under pressure with the corresponding right-angle surfaces of the prisms 12, 12' and 16, 16'. The pressure is maintained until the epoxy or other adhesive on the inner or opposed faces of the mirror blanks 14, 14' and 18, 18' has hardened, polymerized or otherwise become set, after which the press head 36 is raised. Upon such raising of the press head, the reflective coatings on the prisms 12, 12' and 16, 16' are picked up, so to speak, or transferred to the mirror blanks 14, 14' and 18, 18' with the press head and mirror blanks assuming the positions in which they are illustrated in FIG. 4.

If the reflective, mirror-forming layers for application to the downwardly facing mounting surfaces of the mirror blanks are in the form of conventional mirrors, they are first positioned so that their non-reflective or body portions are on the top and face upwards and are then manipulated so that their reflective surfaces are positioned in abutment with the right-angle surfaces of the four prisms 12, 12' and 16, 16'. It is contemplated that when conventional mirrors are used as the reflective, mirror-forming layers, they will be releasably held in abutment with the right-angle surfaces of the aforementioned four prisms by suitable suction means (not shown). After proper mounting of the conventional mirrors in place, the mirror blanks 14, 14' and 18, 18' are caused to receive a coating of epoxy resin or other suitable adhesive on their inner or opposed faces and the blanks are installed in proper registry within the respective inverted V-shaped recesses in the caps 112, 112' and 104, 104'. Thereafter, by means of the lever 40, the press head 36 is lowered to an intermediate position, i.e., until all eight right-angle prism cap surfaces register under pressure with the corresponding right-angle surfaces of the prisms 12, 12' and 16, 16'. The pressure is maintained until the epoxy or other adhesive on the mirror blanks has hardened or set and thereafter the press head 36 is raised after discontinuance of the suction which is used to hold the conventional mirrors releasably on the right-angle surfaces of the four prisms. Upon raising of the press head after releasing the aforementioned suction means for releasably holding the mirrors on the right-angle surfaces of the four prisms, the conventional mirrors are in adhered relation with the downwardly facing mounting surfaces of the mirror blanks with the press head and mirror blanks assuming the positions in which they are illustrated in FIG. 4.

In the present specification, the term "reflective, mirror-forming layers" is intended to mean mirrors which are either formed by the aforementioned replication method or are conventional mirrors.

With the binocular mounting plate 138 in the position in which it is shown in FIG. 4 with the binocular shell 20 in its inverted position, and with the prism-supporting stage 74 removed from its operative position on the posts 66 and 68, a coating of epoxy resin or other suitable adhesive is applied to the outer or peripheral edge portions of the mirror-carrying blanks 14, 14' or to the inner or mating arched edge portions of the bodies 84 of the shell halves 75 and 76, or to both sets of such edges, after which the lever 40 may be again manipulated to lower the press head 36 and thus bring the edges of the mirror blanks 14 and 14' into register with said inner arched edge portions of the bodies 84, thereby placing the mirror-carrying blanks 14 and 14' accurately in the binocular shell and for proper collimation with the remaining mirror-carrying blanks 18 and 18' which are subsequently to be applied to the binocular shell 20. The epoxy resin or other adhesive is allowed to harden or become set so that the positioning of the blanks 14 and 14' as effected by the press head 36 becomes a permanent one, after which the press head 36 is raised, thus leaving the inverted V-shaped recesses in the prism caps 112 and 112' empty as shown in FIG. 5 but returning the mirror-carrying blanks 18 and 18' to their raised positions.

With the prism-supporting stage 74 still removed from its normal or operative position on the upstanding posts 66 and 68 of the press base 30, the binocular mounting plate 138 is rotated or swung throughout an angle of approximately 180° so as to fold it back upon the reaction supporting plate 140 as shown in FIG. 5 and thus bring the binocular shell 20 into its upright position as shown in FIG. 5 of the drawings. Thereafter, an epoxy resin or other suitable adhesive coating is applied to the outer or peripheral edge portions of the mirror-carrying blanks 18 and 18', or to the exposed inner or mating arched edge portions of the bodies 84 of the shell halves 75 and 76, or to both such sets of edges, and the press head 36 is again lowered past its intermediate position so as to bring the thus adhesively-coated edges together and position the mirror-carrying blanks 18 and 18' in proper place in the binocular shell 20 so that all four mirror blanks are now accurately positioned for proper collimation. After the epoxy resin or other adhesive has been allowed to set or harden, the press head 36 is again raised, thus withdrawing the prism caps 104 and 104' from the deposited mirror-carrying blanks 18 and 18'. The binocular is then completed except for the application to the eyepiece and objective rims 80 and 78 of their associated eyepiece and objective lens-carrying barrels which have not been disclosed herein. It is, however, contemplated that so far as the eyepiece barrels of the binocular are concerned, they with proper lenses fixedly mounted therein may be applied to the eyepiece rims 80 of the shell 20 at the same time as the mirror blanks 18 and 18' are mounted in the binocular shell when the press-type mechanism is used when its parts are positioned as shown in FIG. 5. In this connection, it is contemplated that the fixture 64 would be provided outwards of the prism caps 104 and 104' with laterally extending extensions (not shown) having downwardly facing sockets for receiving snugly the lens-equipped eyepiece barrels. Before final lowering of the press head 36 in connection with application of the mirror-carrying blanks 18 and 18' to the shell 20, the lens-equipped eyepiece barrels while in the aforementioned downwardly extending sockets would have their lower rim regions coated with suitable epoxy material to the end that during final lowering of the press head 36 to effect application of the blanks 18 and 18' to the binocular shell 20, the lower portions of the lens-equipped eyepiece barrels would seat within the eyepiece rims 80 where they would become fixedly mounted in place upon hardening of the epoxy material. After application of the four pairs of mirror-carrying blanks to the binocular shell 20, the objective rims 78 of the shell may then be withdrawn from the recesses 142 by loosening the anchoring screws 144 thus freeing the binocular shell 20 from the mounting plate 138. Since the press head 36 now assumes its fully raised position with the inverted V-shaped recesses in the prism caps 112, 112' and 104, 104' now devoid of mirror blanks, the press-type mechanism 10 is ready for a succeeding cycle of mirror forming and installing operations.

It is to be noted at this point that the present press-type mechanism 10 as described above insures positive accuracy of mirror installation in the binocular shell 20. The center-to-center distance between the rim-receiving recesses 142 in the mounting plate 138 and between the set-screw adjusted prisms and the mirror blanks, and all other dimensional aspects of the press-type mechanism are calculated according to the engineering exigencies so that when the objective rims 78 of the binocular shell 20 are received in the recesses 142, the shell is in every respect properly oriented to receive the mirror-carrying blanks 14, 14' and 18, 18' accurately therein. Any discrepancies due to manufacturing tolerances in making the binocular shell 20 or the mirror blanks themselves is compensated for by epoxy or other adhesive correction which takes place during setting of the adhesive coatings while the highly accurate press-type mechanism remains effective to hold the various parts accurately in position, thereby resulting in the binocular being automatically and accurately collimated.

The invention is not to be limited to the exact arrangement of parts shown in the accompanying drawings or described in this specification as various changes in the details of construction may be resorted to without departing from the spirit or scope of the invention. For example, although the method of use of the press mechanism 10 results in application of the mirror-carrying blanks 14 and 14' to the binocular shell 20 during the first lowering of the press head 36 after the stage 74 has been removed and the application of the mirror-carrying blanks 18 and 18' during the second lowering of the press head, these two operations may be reversed so that the mirror blanks 18 and 18' are applied to the shell assembly 30 prior to application of the mirror blanks 14 and 14'. Furthermore, by modifying the shape characteristics of the prism caps 104, 104' and 112, 112', the prism-like master blocks 112, 112' and 116, 116', the shell assembly 20, or the mirror blanks 14, 14' and 18, 18', variously as required, various shapes of mirrors may be applied to a binocular shell by utilizing the basic principles of the invention as outlined above. In addition to the above, it is contemplated that the steps of first applying the reflective, mirror-forming layers to the mirror blanks 14, 14' and 18, 18' and then mounting the mirror-carrying blanks in the binocular shell 20 may be accomplished or carried out by the use of two press-type mechanisms instead of one. Therefore, only insofar as the invention is particularly pointed out in the accompanying claims is the same to be limited.

Having thus described the invention what I claim as new and desire to secure by letters patent is:

1. A press-type mechanism for producing a pair of right-angle mirrors for introduction into the optical system of a viewing instrument, said mechanism comprising a head member, a stage member, means for supporting the two members so that they are relatively movable to and from one another, a prism block mounted on the stage member and presenting a pair of right-angle master surfaces facing in the direction of the head member and adapted to receive thereon reflective, mirror-forming layers, a prism cap mounted on the head member and presenting in opposed relation with the master surfaces of the prism a pair of right-angle surfaces defining a mirror blank-receiving recess, and a one-piece mirror blank fitting in said recess and presenting right-angle mounting surfaces for mating engagement respectively with said master surfaces when the two members are moved together, such mating engagement serving to transfer the reflective, mirror-forming layers from the master surfaces to said mounting surfaces.

2. A press-type mechanism as set forth in claim 1 and wherein the prism block is removably and adjustably mounted on the stage member, the prism cap is removably and adjustably mounted on the head member, and power means are provided for moving the two members to and from one another.

3. A press-type mechanism for introducing two pairs of right-angle mirrors into the optical system of an open-sided shell of a viewing instrument in porro relationship, said mechanism comprising a shell-supporting base member, a press head member, means for supporting the two members so that they are relatively movable to and from one another between remote and proximate positions with respect to each other, a reversible shell mount positioned on said base member and adapted to support the shell in either an upright position or an inverted position, means on said press head member for releasably supporting said pairs of right-angle mirrors, and means for moving said press head member and base member between their remote and proximate positions whereby a first movement of the two members to their proximate position will serve to position one of said pairs of right-angle mirrors in one open side of the shell when the latter is in its upright position, and whereby a second movement of the two members to their proximate position will serve to position the other pair of right-angle mirrors in another open side of the shell when the latter is in its inverted position.

4. A press-type mechanism as set forth in claim 3 and wherein said shell mount is in the form of a flat plate which is hingedly secured to the press base member for swinging movements throughout an angle of the order of 180°.

5. A press-type mechanism for creating a plurality of mirrors and then introducing the mirrors into the optical system of a viewing instrument having a mirror-receiving shell, said mechanism comprising a shell supporting base, a press head movable toward and away from the base from a remote position through an intermediate position to a final position in close proximity to the base, a removable intermediate stage operatively interposed between the press head and the base, a plurality of master surfaces, one for each mirror, mounted on said stage and designed to receive thereon reflective, mirror-forming layers, and a plurality of mirror blanks mounted on said head and presenting mounting surfaces, one for each master surface, said blanks being designed for effective mating engagement with their respective master surfaces when said stage is in its operative interposed position and the press head is moved to its intermediate position, said mating engagement between the mounting and master surfaces serving to effect transfer of the mirror-forming layers from the master surfaces to the mounting surfaces, movement of the press head to its final position with the stage removed serving to place the mirror blanks with the mirror-forming layers thereon accurately in the optical system of the instrument shell on the base.

6. A press-type mechanism as set forth in claim 1 and wherein said mirror blanks are formed each with a pair of transfer surfaces extending at a right angle to one another, and the master surfaces are formed on the right angle faces of prism-like blocks.

7. A press-type mechanism as set forth in claim 6 and wherein each mirror blank is supported in a prism cap which is removably and adjustably mounted on the press head, and each prism-like block is removably and adjustably mounted on said intermediate stage.

8. A press-type mechanism as set forth in claim 6 and wherein the mirror-receiving shell of the viewing instrument is provided with openings on opposite sides thereof, each opening being adapted to receive therein one of said mirror blanks, and a reversible mounting plate for the instrument shell is hingedly mounted on the press base for selectively reversing the position of the shell for successive application of the mirror blanks respectively into said openings during successive movements of the press head to its final position.

9. A press-type mechanism for creating a series of eight mirrors and then introducing the mirrors into the optical system of a mirror-type binocular having a shell consisting of two hingedly connected shell halves, said mechanism including a shell-supporting base, a column projecting upwardly from the base, a press head mounted on said column to slide vertically toward and away from the base from a raised position remote from the base through an intermediate position to a final lowered position in close proximity to the base, an intermediate stage fixedly but removably interposed between said press head and base, a reversible shell mounting member on said base for supporting the binocular shell in either an upright or an inverted position, two pairs of prism blocks on said stage each of which presents a pair of generally upwardly facing right angle master surfaces for receiving thereon reflective, mirror-forming layers, two pairs of prism caps on said press head each of which presents a pair of generally downwardly facing right angle surfaces defining mirror blank-receiving recesses, a mirror blank fitting within each recess and presenting right angle mounting surfaces designed for mating engagement with respective master surfaces when said stage is in its operative interposed position and the press head is moved to its intermediate position, such mating engagement serving to effect transfer of the mirror-forming surfaces from the master surfaces to the mounting surfaces, movement of the press head to its final position with the intermediate stage removed serving to place the mirror blanks associated with one pair of prism caps, together with the mirror-forming layers thereon, into said optical system, of each shell half when the mounting member is positioned so that the shell is either in its upright or its inverted position, and means for effecting up and down sliding movement of said press head on the column.

10. A press-type mechanism as set forth in claim 9 and wherein anti-torque means are provided for preventing rotation of the press head with respect to said column, said anti-torque means serving at all times to maintain the prism caps on the press head in operative vertical register with their respective prism blocks when the intermediate stage is in its operative position.

11. A press-type mechanism as set forth in claim 10 and wherein said anti-torque means comprises a vertical guide post positioned in slightly laterally offset relation with respect to the column and projecting through a vertical slot in said press head.

12. A press-type mechanism as set forth in claim 9 and wherein said shell mounting member is in the form of a flat plate which is hingedly secured to the press base for swinging movements throughout an angle of the order of 180°.

13. A press-type mechanism as set forth in claim 9 and wherein each shell half is provided with an objective rim designed for reception therein of a lens-containing objective barrel, the mounting member is in the form of a flat plate having semi-circular recesses therein designed for reception of the objective rims of the shell halves, and the center-to-center distance between said recesses is such that when the objective rims are in position in such recesses the binocular shell as a whole is maintained in proper mirror-receiving position regardless of whether the shell be upright or inverted.

14. A press-type mechanism as set forth in claim 9 and wherein said shell mounting member is in the form of a flat plate which is secured along one edge region thereof by a hinge connection to the press base for swinging movements throughout an angle of 180°, each shell half is provided with an objective rim designed for reception therein of a lens-containing barrel, semi-circular recesses are provided in said mounting plate for reception therein of objective rims of the shell, the center-to-center distance between said recesses is such that when the objective rims are in position in the recesses, the binocular shell as a whole is maintained in proper mirror-receiving position regardless of whether the shell be upright or inverted, and the press base is in the form of a block-like body having a clearance recess formed therein and into which a major portion of the binocular shell projects when the mounting member maintains the binocular shell in its inverted position.

15. A press-type mechanism as set forth in claim 9 and wherein said removable stage is in the form of an elongated bar-like member the opposite ends of which are removably supported on the upper ends of a pair of upstanding posts carried by the press base, and each pair of prism blocks is removably anchored in a cradle which is fixedly mounted on said bar-like member.

16. A press-type mechanism as set forth in claim 15 and wherein said prism caps are removably and adjustably mounted on the press head.

17. A press-type mechanism as set forth in claim 9 and wherein the means for effecting sliding movement of the press head embodies a pair of toggle links, one of which is effectively pivoted to said column and the other of which is effectively pivoted to the press head, and a manipulating lever is connected and extends away from one of said toggle links.

* * * * *

UNITED STATES PATENT AND TRADEMARK OFFICE
CERTIFICATE OF CORRECTION

PATENT NO. : 4,140,568
DATED : February 20, 1979
INVENTOR(S) : William J. Beecher It is certified that error appears in the above–identified patent and that said Letters Patent are hereby corrected as shown below:

Column 7, line 21, change "positioning" to --position--.

Column 7, line 28, change "positions" to --positioning--.

Column 13, line 13, change "1" to --5--.

Signed and Sealed this

Seventeenth Day of June 1980

[SEAL]

Attest:

SIDNEY A. DIAMOND

*Attesting Officer*     *Commissioner of Patents and Trademarks*